United States Patent [19]

Chung et al.

[11] Patent Number: 5,042,064
[45] Date of Patent: Aug. 20, 1991

[54] CALL CONTROL STRATEGY FOR HIGH CAPACITY TELECOMMUNICATION SERVICES

[75] Inventors: Li-Jin W. Chung, Lincroft; John Crescenti, Freehold; Richard E. Machol, Princeton Junction, all of N.J.

[73] Assignee: AT&T Bell Laboratories, Murray Hill, N.J.

[21] Appl. No.: 518,678

[22] Filed: May 3, 1990

[51] Int. Cl.$^5$ ............................................. H04M 3/36
[52] U.S. Cl. ...................................... 379/113; 379/243
[58] Field of Search ................. 379/113, 243, 244, 258

[56] References Cited

U.S. PATENT DOCUMENTS 4,907,256 3/1990 Higuchi et al. ...................... 379/113

OTHER PUBLICATIONS

"Managing a network that won't sit still", AT&T Bell Laboratories Record, Aug. 1984, J. M. Mocenigo et al, pp. 23–26.

"Nemos-The Network Management System for the AT&T Long Distance Network" IEEE Intl Conf. on Comm., Jun. 11–14, 1989, J. N. Brunken eta l, pp. 1193–1197.

Primary Examiner—Stafford D. Schreyer
Attorney, Agent, or Firm—Frederick B. Luludis

[57] ABSTRACT

A threshold-based call control facility is provided for use in a telecommunications network switch to control the processing of calls associated with so-called high capacity (HICAP) telecommunications services. In addition, a feature is provided for dynamically changing a respective threshold value at each network switch until the number of such calls reaching a respective destination switch, and hence an associated trunk group, reaches an optimum level, in which each such change in the value of the threshold is determined as a function of traffic data accumulated by the destination switch for the associated trunk group.

10 Claims, 7 Drawing Sheets

FIG. 2

PRE-SCREEN TABLE

| HICAP NUMBER |
|---|
| NXX-XXXX |
| MYY-YYYY |
| PZZ-ZZZZ — 203 |
| RSS-SSSS |
| ⋮ |
| TRR-RRRR |
| ⋮ |

FIG. 3

TREATMENT TABLE — 300

| DIALED NUMBER | SERVICE | ON/OFF |
|---|---|---|
| 800-NXX-XXXX | 2 | a |
| 800-MYY-YYYY | 1 | a |
| 800-PZZ-ZZZZ | 2 | a |
| ⋮ | ⋮ | ⋮ |
| 900-RSS-SSSS | 3 | a |
| ⋮ | ⋮ | ⋮ |
| 900-TRR-RRRR | 1 | a |
| ⋮ | ⋮ | ⋮ |

303 points to 800-PZZ-ZZZZ row.

| THRESHOLD VALUE | CURRENT COUNT | INTERVAL | SERVICE |
|---|---|---|---|
| $m_1$ | $n_1$ | $p_1$ | 1 |
| $m_2$ | $n_2$ | $p_2$ | 2 |
| ⋮ | ⋮ | ⋮ | ⋮ |
| $m_n$ | $n_n$ | $p_n$ | 3 |

602 points to $m_2$ row.

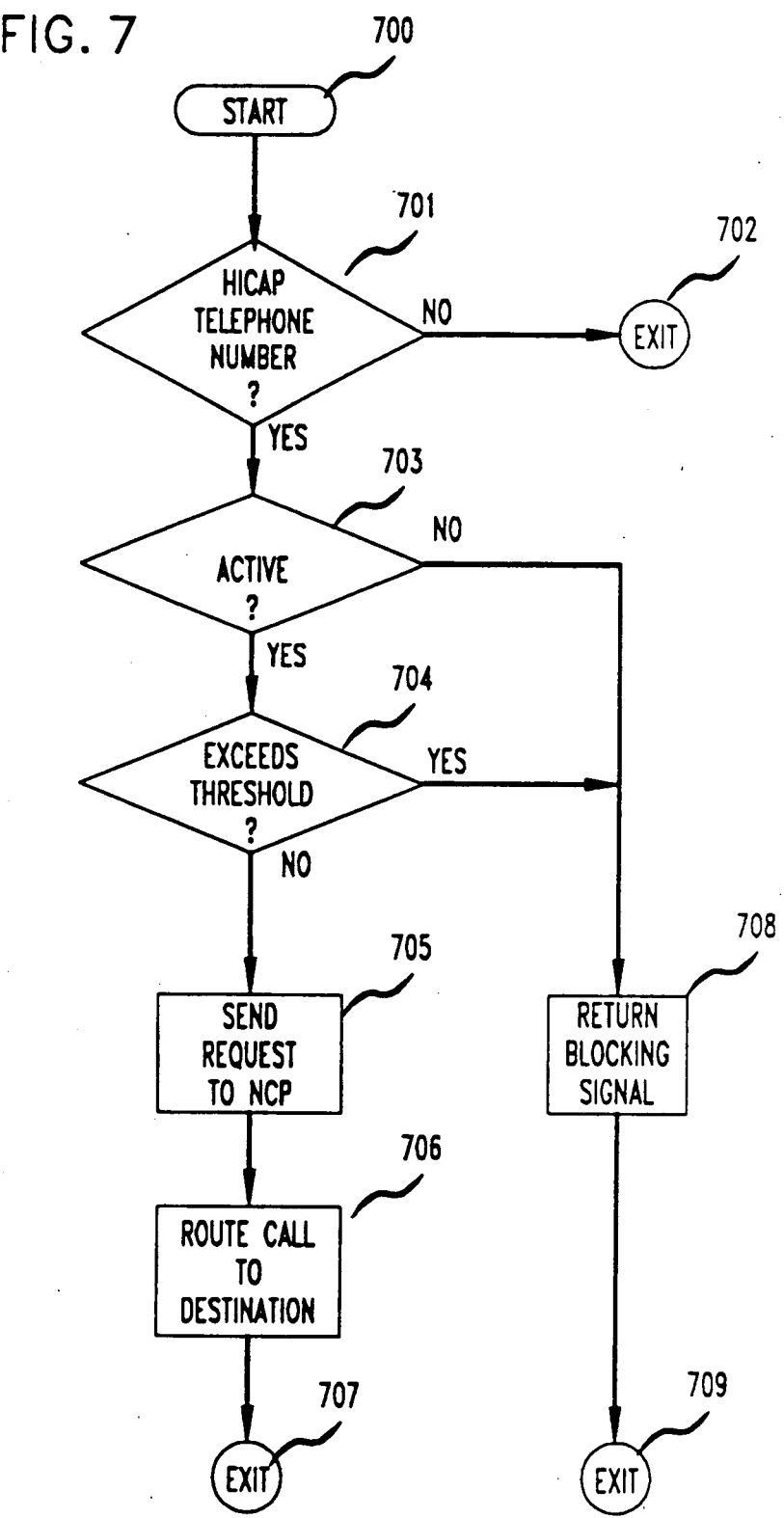

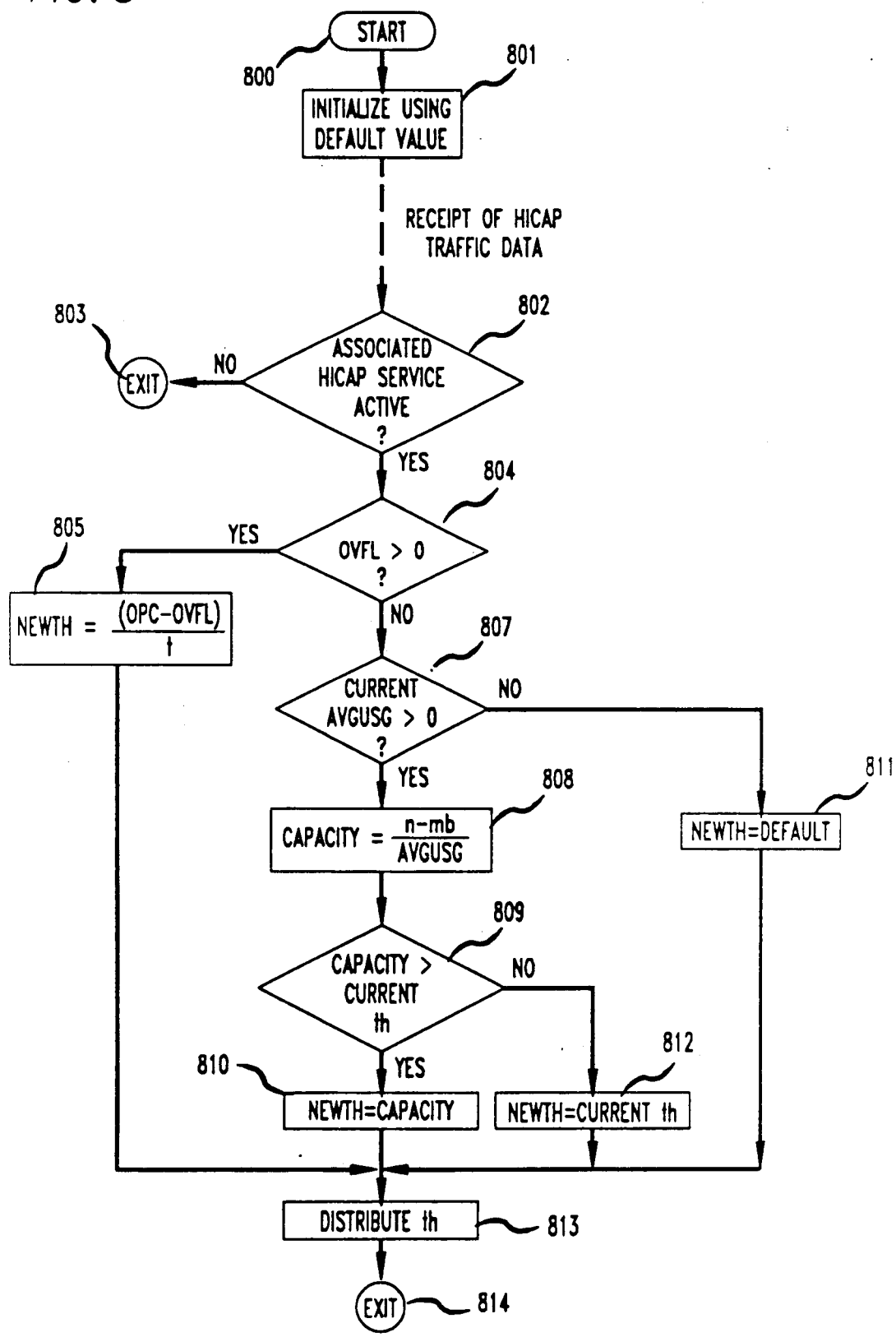

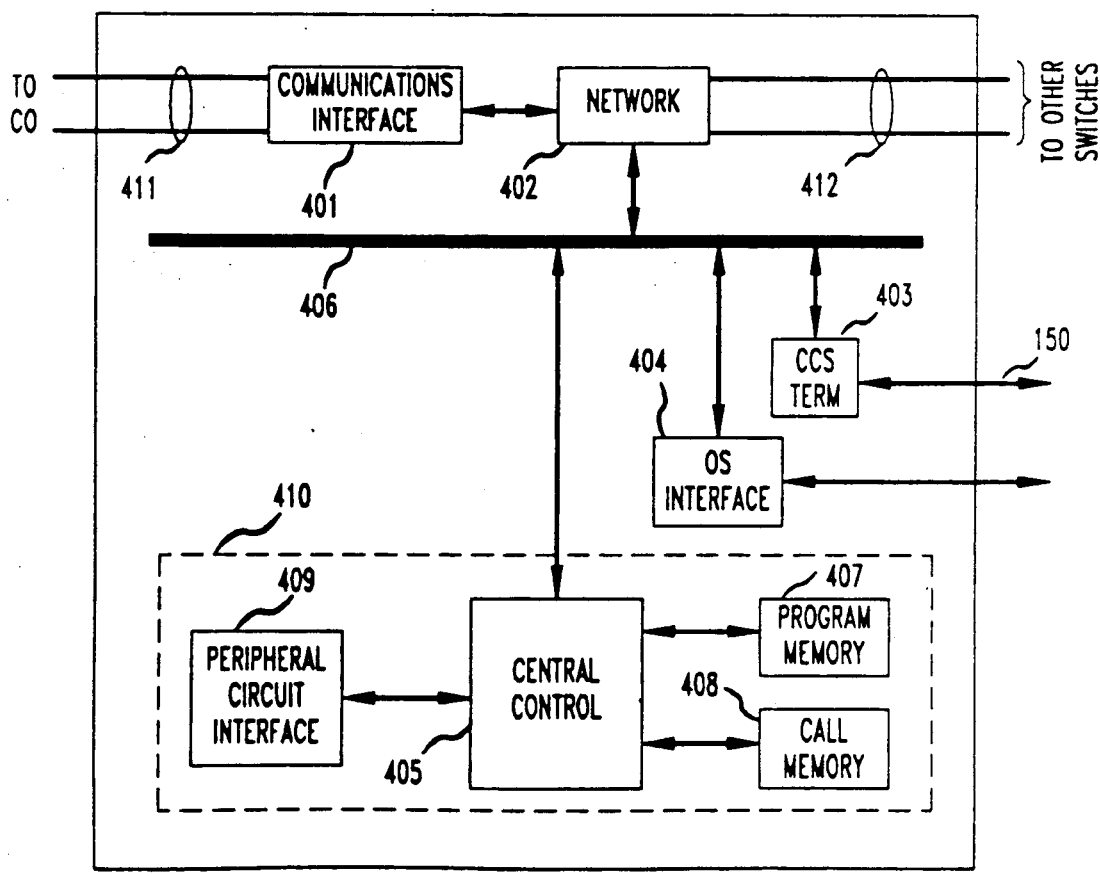

CALL CONTROL STRATEGY FOR HIGH CAPACITY TELECOMMUNICATION SERVICES

FIELD OF THE INVENTION

The invention relates to high capacity call forwarding services and more particularly relates to controlling the rate at which high capacity calls are processed.

BACKGROUND OF THE INVENTION

The AT&T public switched network employs a centralized database (NCP) to translate a telephone number of a so-called 800 or 900 service call into an associated destination code. It can be appreciated that a centralized database could be driven into an overload condition if it receives from a switching office and within a short duration of time a large number of translation requests directed to a particular 800 or 900 service telephone number. To handle this problem, the centralized database employs a conventional rate-based call control strategy to track the rate of such requests. If the database finds that the rate of such requests meets a predetermined limit, then the database reduces the rate by causing the switching office to block, for a limited duration, subsequent calls directed to the particular service number.

For example, if the established rate is two requests per second, then the database accepts from a particular switching office and for a particular service telephone number a maximum of two requests within a one-second interval, in which the interval is equally divided among the number of requests and begun upon receipt of the first of such requests. Accordingly, the database would respond to the first request and begin the one-second interval. However, if the database receives a second request within the first-half of the one-second interval, then the database would block that request. It can be appreciated that if the database did not receive over the remainder of interval a request associated with the particular service telephone number, then the associated rate for that telephone number would be reduced to one request for the current interval.

Included in the family of 800 and 900 services is a so-called high-capacity (HICAP) service, which is provided to handle a large volume of calls that may be received in response to a particular national (or regional) mass call-in promotion. A characteristic of HICAP calls is that a majority of the calls are typically placed during a short duration of time, usually during the first several minutes of the promotion. As such, the rate of translation requests that the data base would receive from a particular switching office would quickly exceed the established rate, thereby causing the database to impose blocking. However, such blocking would undermine the success of a HICAP promotion, which depends on an appreciable number of calls reaching the destination defined by the associated promotion telephone number.

Herein lies the nub of the problem. On the one hand, an appreciable number of calls need to reach the HICAP destination to ensure that the promotion would enjoy a certain measure of success. On the other hand, if the allowed number of HICAP translations requests all occur within the same segment of the interval, then the database in accord with the rate-based strategy would impose blocking, thereby restricting the number of calls that would reach the promotion number, and thereby undermining the success of the HICAP promotion.

SUMMARY OF THE INVENTION

The provision of HICAP services is advanced by employing, in accordance with the invention, a threshold-based call control strategy for HICAP calls, rather than a rate-based strategy, and by disposing the threshold strategy at the point at which HICAP calls enter the network, rather than at the database. Specifically, the invention allows a predetermined number of calls to be processed within a predetermined interval regardless of when the calls occur within the interval. Accordingly, then, if the threshold happens to be, for example, two calls within a one-second interval, then those calls are processed regardless of when they occur within the one-second interval.

Thus, the invention achieves a certain level of control over the number of translation requests that are ultimately sent to the database while allowing a predetermined level of calls associated with a particular promotion telephone number to reach the appropriate destination, thereby guaranteeing that a respective mass call-in promotion would enjoy a predetermined measure of success.

Moreover, in accord with an aspect of the invention, the threshold is dynamically adapted for each such HICAP telephone number when it is active so that the value of the threshold may be finely tuned over the course of the HICAP promotion, and without unduly overloading the destination switch.

BRIEF DESCRIPTION OF THE DRAWINGS

In the drawing:

FIG. 2 is an example of a pre-screening table contained within the memory of each switch of FIG. 1;

FIG. 3 is an example of a HICAP call treatment table contained within the memory of each switch of FIG. 1;

FIG. 6 is a table of threshold values contained within the memory of each switch of FIG. 1, in which each threshold value is associated with a particular HICAP service;

FIG. 7 is a flow chart of the program which implements the invention in each switch of FIG. 1;

FIG. 8 is a flow chart of the program which implements the dynamic thresholding feature in the operations system (OS) of FIG. 1;

FIG. 9 is an example of the manner in which an entry in the table of FIG. 3 may be expanded to accommodate the dynamic thresholding feature;

FIG. 10 is another example of the manner in which an entry in the table of FIG. 3 may be expanded to accommodate an alternative version of the dynamic thresholding feature;

FIG. 12 is a broad block diagram of an electronic switch which implements each of the switches of FIG. 1.

DETAILED DESCRIPTION

Figure 1:
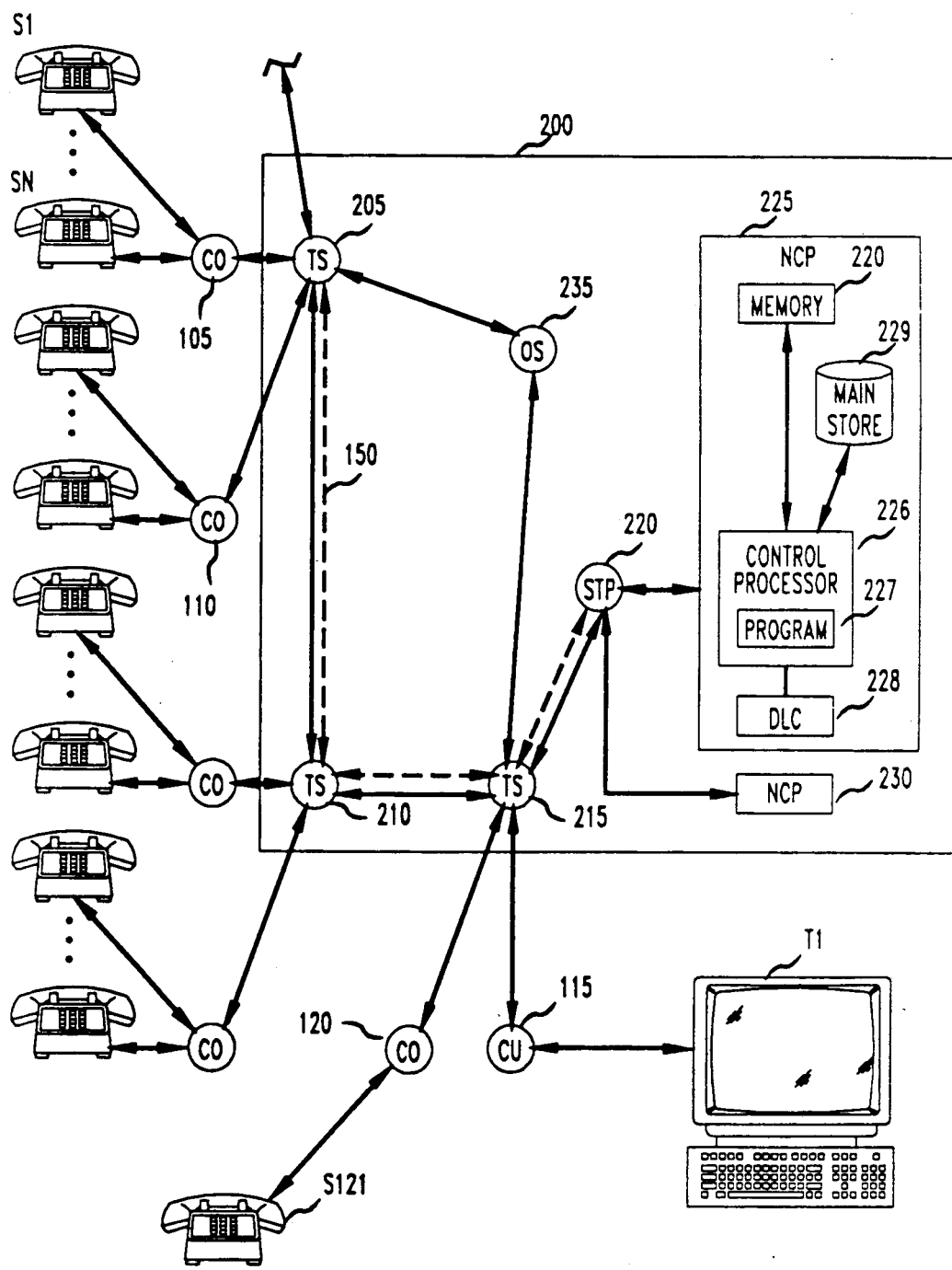
FIG. 1 is a block diagram of a network in which the invention may be implemented.

In an exemplary embodiment of the invention, communications network 200, FIG. 1, may be a telephone network, such as, for example, the well-known AT&T public switched network, that provides long distance telephone and data services for users (subscribers), such as, for example, the users associated with telephone stations S1 through SN and S121.

Network 200 includes, inter alia, a plurality of Toll Switching (TS) offices, three of which, 205, 210 and 215, are shown in the FIG. Such toll switches may be any one of a number of well-known types of switching equipment, such as, for example, the well-known No. 4ESS and No. 5ESS (Electronic Switching System) commercially available from AT&T. It is seen that each toll switch, e.g., switch 205, is connected to a number of central offices, e.g., 105 and 110. The operation of a central office is well-known and will not be discussed herein. However, it suffices to say that a CO is arranged to connect to an associated toll switch of network 200 a calling station (originator), e.g. station S1, which has dialed a particular telephone number. A CO is also arranged to connect a call received from an associated toll switch (destination switch) to a called station, e.g., station T1.

In addition, each toll switch e.g., 205, 210, etc., is connected to a data link 150, which may be, for example, the well-known Common Channel Signaling System Network (CCS). The CCS Network is arranged so that the toll switches may exchange data messages with one another in order to connect, via network 200, a calling telephone station, e.g., station S1, with a called station, e.g., station T1. (It is noted that station T1 represents a number of different devices each capable of receiving a telephone call. For example, station T1 may be a switchboard, or a group of telecommunications terminals, that interface with network 200 via a control unit, such as, for example, a PBX or automatic call distributor (CU) 115.)

Network 200 also includes a centralized operations system (OS) 235, such as AT&T's Network Management Operations System, which operates to collect, in real time, from each of the network switches various traffic data (statistics) that the switches accumulate over a predetermined period of time—illustratively five minutes. Thus, at the beginning of each such period, OS 235 collects from each of the switches the traffic data that the switch accumulated over a preceding period. Such traffic data includes, inter alia, (a) a peg count (number) of HICAP calls that the switch completed, the number of HICAP calls which overflowed as a result of an all-trunks busy condition, (c) average usage of the trunk group used to complete associated HICAP calls, and (d) the number of trunks in that group that were maintenance busy. Based on receipt of that traffic data, OS 235 calculates a new threshold value for the associated HICAP service, and then sends the value to each of the network switches for storage in their respective memories. In addition, OS 235, uses other traffic data that it receives to dynamically control network routing strategies to reroute overflow traffic away from congested network links to links having available capacity. (It is noted that AT&T's Network Management Operations System is discussed in the article "Nemos—The Network Management System for the AT&T Long Distance Network," J. N. Brunken et al, *IEEE International Conf. on Communications*, at pp. 1193–1197, which is incorporated herein by reference.)

Network 200 further includes a number of centralized data bases commonly referred to as Network Control Points (NCP). Such NCPs, for example, NCPs 225 and 230, are positioned at various locations within network 200 and are interconnected with the toll switches via the CCS network and STP 220 so as to support the provision of various network 200 features, such as the aforementioned advanced 800 and 900 services.

Accordingly, a customer, for example, a business customer associated with telephone station T1, may subscribe to one or more of such advanced services, for example, the so-called Inbound HICAP (High Capacity) service. In doing so, the business customer is assigned a particular 800 (HICAP) telephone number associated with the service. Thereafter, the business customer in conjunction with a particular activity, for example, a telemarketing campaign, may publicly announce the assigned 800 number. A telephone user who responds thereto and dials that number is then connected to station T1, which is identified by a destination code (telephone number) obtained from one of the NCPs 225 or 230. (It is noted that the NCPs are also arranged to translate a particular HICAP telephone number into one of a number of different destination codes each terminating at a different destination switch of network 200. Thus, a telephone user located in one part of the country and who dials a HICAP telephone number may be connected to one destination point defined by a first destination code, whereas a user located in another part of the country and who also dials the same HICAP may be connected to another destination point defined by a second destination code, in which each such destination point terminates at a respective facility provided by the HICAP subscriber.)

In particular, toll switch 205 responsive to receipt of the assigned 800 number sends to one of the NCPs via Signal Transfer Point switch 220 a request message. The request message includes a number of fields respectively identifying, inter alia, toll switch 205, a destination group index, the dialed 800 number, and a call identifier. The destination group index is used by STP 220 to route the request message to the appropriate NCP. The call identifier associates a subsequent NCP response message with the proper call (request).

In the instant case, it is assumed that STP 220 forwards the request message to NCP 225. It is seen from the FIG. that an NCP, e.g., NCP 225, includes, inter alia, a control processor 226, which operates under the control of a program stored in memory 227 associated with processor 226, and Data Link Controller (DLC) 228, which operates to transmit and receive data messages to and from the toll switches via STP 220. An NCP also includes a mass storage unit 229, which may be, for example, a number of so-called memory disk units, for the storage of translation data that is used to translate a telephone number accompanying a request into a destination code (telephone number). Thus, upon receipt of the request message, NCP 225 translates the dialed 800 number into the destination number associated with station T1, forms a response message comprising a number of data fields and then sends the response message to toll switch 205 via STP 220. The response message includes, inter alia, (a) the identity of toll switch 205, which is necessary in this case to route the message back to the proper toll switch via STP 220, (b) the destination telephone number supplied by memory 229 so that the call may be properly routed to station T1, and (c) a call identifier equivalent to the call identifier contained in the request message. Upon receipt of the response message, toll switch 205 then routes to the destination number the telephone call associated with the dialed 800 number.

It can be appreciated that in a HICAP situation, the scope of the business customer's telemarketing campaign may be either national, or regional, and may involve some type of media, such as "television" to advertise particular subject matter (i.e., a product). During the "televised" campaign, consumers may be urged to call the enhanced 800 service telephone number assigned to the business customer. It can also be appreciated that a large number of consumers might respond to the campaign and dial the announced 800 number. Experience shows that when that is indeed the case a majority of such consumers dial the 800 number during the first several minutes of the televised campaign. This means that the network 200 toll switches would be faced with sending to the NCPs, and within a relatively short duration of time, a large number of the aforementioned requests.

Disadvantageously, if a toll switch, e.g., TS 205, is one that happens to be serving a densely populated area then that toll switch could be the source of a large number of such requests, which, in turn, may cause the NCP responding thereto to be driven into a congested (overload) state. As mentioned above, in prior HICAP arrangements, a NCP, e.g., NCP 220, protects itself from being driven into a congested state by invoking a so-called rate-based (gap) call control strategy. However, as also mentioned above, a rate-based strategy is somewhat at odds with the basic notion of HICAP services, since the strategy adversely limits the number of HICAP calls that can be forwarded to the business customer's destination number.

This problem is dealt with, in accordance with an aspect of the invention, by using a threshold-based strategy, rather than a rate-based strategy, to help guarantee that a certain number of HICAP calls reach the destination number. In addition, the threshold-based strategy is disposed, in accordance with an aspect of the invention, at the toll switch, rather than at the NCP, to limit the number of requests that are sent to the NCP, thereby further protecting the NCP from being driven into an overload state.

Specifically, a system administrator associated with a particular toll switch, e.g., toll switch 205, "calculates" a threshold value for a each type of HICAP service. The administrator calculates the value as a function of different factors, including, for example, the (a) level (volume) of HICAP calls of the particular type that the switch expects to receive and process within a particular period (interval) of time and (b) level of other types of calls that the switch expects to receive and process during the promotion of the service. Such other calls may be, for example, residential, business, and other advanced 800 and/or 900 service calls, which either originate or terminate at the switch. The administrator then stores the threshold value in the memory of the switch at a memory location indirectly identified with the particular HICAP service.

(It is noted at this point that the AT&T network provides a number of HICAP services. For example, one such service is referred to as "Inbound" HICAP, as mentioned above, and another such service is referred to as "INFO" HICAP. The differences between such services are well-known and will not be discussed herein. However, it suffices to say that, unlike an Inbound HICAP call, there is no need to request a destination code from the associated NCP to route an INFO HICAP to its destination.)

For the sake of clarity, it will be assumed that the business customer at station T1 has subscribed to Inbound HICAP and that the threshold value calculated for that service is 3. That is, 3 calls within a predetermined interval (e.g., a one-second interval), as will be explained below. It is to be understood of course that the calculated value could very well be one of a range of numbers, for example, a number within the range of 1–255. The threshold value, on the other hand, could be a so-called default value, in which in lieu of the calculated value, a default value of, for example, 50, is stored in the aforementioned memory location along with value of the associated interval. Similarly, the value of the interval may be adjusted to one of a number of different intervals, such as, for example, a 2-or 3-second interval.

With the foregoing in mind, we now discuss the manner in which a switch, e.g. toll switch 205, processes a HICAP call in accordance with the invention. In particular, toll switch 205 responsive to receipt of the Inbound HICAP telephone number assigned to the customer at station T1, first determines if the number is associated with a particular HICAP service. That is, toll switch 205 pre-screens a string of the digits of the dialed number—illustratively the first four digits following the service code (800 or 900)—by comparing those digits with similarly positioned digits of telephone numbers contained in a pre-screening table stored in the memory of switch 205. An example of a pre-screening table is shown in FIG. 2. If the result of the comparison turns out to be false, then switch 205 processes the call in a conventional manner. Assuming that the dialed telephone is 800-PZZ-ZZZZ (in which the letters represent different numbers), then the result of the comparison would turn out to be true, since switch 205 would find that the string of digits PZZZ match the similarly positioned string of the telephone number stored at line 203 of FIG. 2.

In that instance, then, switch 205 would go on to determine if the dialed telephone number matches a telephone number contained in a so-called HICAP treatment table also stored in the memory of switch 205. An example of such a treatment table is shown in FIG. 3. Specifically, the HICAP call treatment table comprises a number of records each having a number of fields. The first field of a record, DIALED NUMBER, contains a respective HICAP telephone number. The second field, SERVICE, identifies the HICAP service, that is associated with the telephone number stored in the first field of the record. It is seen from the FIG. that a value of, for example, 1, 2 or 3 has been stored in the service field of respective ones of the records to identify the respective HICAP service. It is assumed herein that the values of 1, 2 and 3 represent INFO HICAP, Inbound HICAP, and BBBB HICAP, respectively, where BBBB represents another type of HICAP service.

The third field of a record, ON/OFF, indicates whether the HICAP service identified in field 2 is active or inactive for the associated telephone number stored in field 1. The letter "a" shown in the FIG. represents one of a number of different values, such as, for example, a binary value, in which a binary one represents "active" or on, and in which binary zero represents "inactive" or off.

Accordingly, then, switch 205, as a result of searching through the treatment table, would find that the dialed HICAP telephone number (800-PZZ-ZZZZ) is stored in record 303. Armed with that information, switch 205 would then read the value contained in the ON/OFF field of record 303 to determine if the associated Inbound HICAP service for the telephone number stored in field 1 is either active or inactive. If switch 205 finds that the ON/OFF field value is set to a zero (inactive), then switch 205 would block the call by returning to station S1 via CO 105 (FIG. 1) a particular blocking signal. If, on the other hand, switch 205 finds that the ON/OFF field value is set to a one (active), then switch 205 would determine if the current Inbound HICAP call would cause the threshold established for that service to be exceeded for the current interval.

Figure 4:
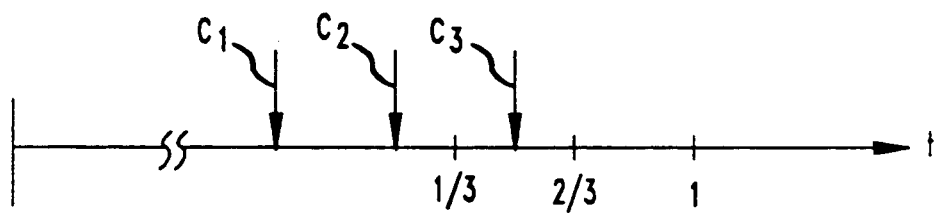
FIGS. 4 and 5 illustrate the difference between a rate-based strategy for controlling the rate at which HICAP calls are processed and the strategy implemented by the present invention.
Figure 5:
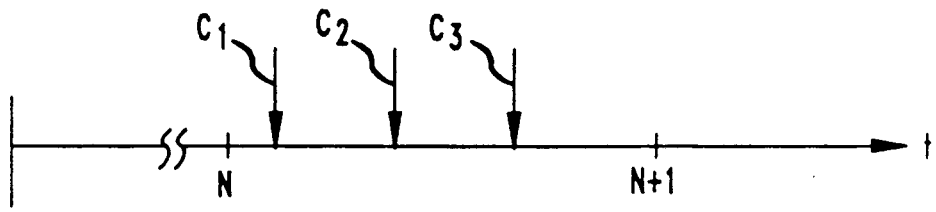

(It would be useful at this point to further review the difference between rate-based (gap) control and HICAP threshold control, which are illustrated in FIGS. 4 and 5, respectively. Specifically, and assuming a rate-base or gap of three calls per second, the associated NCP starts the one second rate-based interval upon receipt of a request as indicated by arrow c1 in FIG. 4. However, once the interval has been started, the switch would not accept another request until the second one-third of the interval. That is, if the switch receives a second request within the first one-third of the interval, then the switch would block that request. Accordingly, the switch would block request C2, since it is the second of two requests occurring within the first one-third of the interval. However, the switch would not block the third request C3, since that request is first to occur in the second one-third of the interval.

In contrast, the HICAP threshold control illustrated in FIG. 5 is initiated at the toll switch, e.g., switch 205, rather than at the NCP, as mentioned above. In addition, since the control is driven by a threshold, rather than a rate, switch 205 would not block the first three calls regardless of where they occur within the associated one-second interval, in which the interval is established by the switch 205 system clock, rather than by the arrival of a request (call). Accordingly, it can be appreciated that for rate-based, or gap, control, the actual rate could be less than the set rate. Whereas, for threshold control, the actual rate is substantially equal to the set rate.)

Continuing with the illustrative example, and referring now to FIG. 6, there is shown threshold table 600 comprising a plurality of records that are stored in the memory of switch 205. Each such record is associated with a respective HICAP service, and includes a number of fields. Namely, a threshold value field, m, count field, n, and interval field, p. Switch 205 uses the count field, n, to track, or count, over the interval specified by the value stored in the associated p field, the number of calls that have thus far been received for the associated service. Assuming that record 602 is associated within Inbound HICAP and the values of m2, n2 and p2 are 3, 2 and 1, respectively, then switch 205 would unload a copy of the record and compare the values contained in fields m2 and n2 with one another. Switch 205 does so to determine if it has already reached the threshold set for the number of Inbound HICAP calls that it may process for the current interval. (It is apparent that in a particular implementation, table 600 could be combined with table 300, as will be shown below.)

Accordingly, if switch 205 finds that the value of n2 is equal to or greater than the value of m2, then switch 205 would block the current Inbound HICAP call in the manner described above. Otherwise, switch 205 would (a) increment the value of n2 and store the new value in the n2 field of record 602, and (b) then send to one of the NCPs 225 and 230 via STP 220 (FIG. 1) a request for the destination number defined for the Inbound HICAP telephone number that switch 205 is processing. Thereafter, and upon receipt of the destination number (code), switch 205, in a conventional manner, routes to destination switch, e.g. switch 215, identified by the destination code the current Inbound HICAP call that switch 205 is processing.

It is noted that each toll switch, e.g., switch 205, is arranged, to clear the count field, n, of a record contained in table 600 at the end of the interval defined in the associated p field. That is, at the end of each one-second interval, as defined by the system clock, switch 205 clears field n2 of record 602, in order to prepare that record for the processing of Inbound HICAP calls that may be received during the next interval of time.

The foregoing threshold strategy is implemented under the control of a software program which is stored in each of the network switches and which is invoked upon receipt of a call, as shown in FIG. 7. Specifically, the program is entered at block 700 responsive to receipt of dialed digits associated with a respective telephone call, and then proceeds to block 701 where it prescreens the dialed digits, in the manner described above. That is, the program determines if the telephone call is a HICAP call, and proceeds to block 703 if that is indeed the case. Otherwise, the program exits via block 702 by passing the call to a program arranged to process calls in a conventional manner.

At block 703, the program determines from its HICAP treatment table if the associated HICAP service is active for the telephone number defined by the received digits. The program proceeds to block 704 if it finds that to be the case. Otherwise, the program proceeds to block 708 where it returns a blocking signal, in the manner described above, and then exits via block 709.

At block 704, the program determines, in the manner discussed above, if the received HICAP call would cause the associated threshold value to be exceeded for the current interval. The program proceeds to block 708 to return the blocking signal if the threshold would be exceeded. Otherwise, the program proceeds to block 705 where it updates the call count (m) and then sends the aforementioned request message to an NCP to obtain the destination telephone code for the HICAP telephone number that the program is processing. Upon receipt of the code, the program proceeds to block 706 where it routes the call to the destination switch, which then forwards the call to the associated HICAP subscriber. The program then exits via block 707.

As mentioned above, the threshold values associated with respective HICAP services are manually calculated by a system administrator and then loaded into the threshold tables contained in the memory of each network switch. Disadvantageously, such threshold values are not very accurate. What this means is that a particular threshold value might be set too low, thereby restricting the number of associated HICAP calls which reach the destination switch. The particular threshold value, on the other hand, might be set too high, thereby allowing an excessive number of associated HICAP calls to reach the destination switch only to be blocked thereat as a result of overloading the associated trunk group.

We deal with this problem by dynamically adapting a threshold value associated with a respective active HICAP service. In doing so, we implement the concept of associating a threshold value with a respective HICAP telephone number. Accordingly, then, a threshold value is associated with a HICAP subscriber and is dynamically "calculated" by OS 235 based on the traffic data (statistics) received from the destination switch which forwards such calls to the subscriber. Once OS 235 calculates a new threshold value, it then sends the value to each network switch for use during the next traffic interval.

Specifically, and assuming that switch 215 is the destination switch for a particular active HICAP service (e.g., Inbound HICAP) subscribed to by the business customer at station T1, then switch 215 accumulates traffic data associated with the trunk group that is used to forward the associated HICAP calls to station T1. As mentioned above, switch 215 forwards to OS 235 traffic data accumulated over a predetermined time interval, for example, a five-minute interval. As also mentioned above, such data includes (a) a peg count (number) of HICAP calls that the switch attempted to complete, (b) the number of HICAP calls which overflowed as a result of an all-trunks busy condition, (c) the average usage of the trunk group(s) used to complete associated HICAP calls, and (d) the number of trunks in that group that were maintenance busy (i.e., trunks that are unavailable due to maintenance). Based on that data, OS 235 calculates a new threshold value for the associated trunk group, and stores that value in each of the network switches. In this way, the value of the threshold soon reaches an optimum level, a level which causes the overflow count to substantially equal zero.

In particular, and referring now to FIG. 8 which illustrates a flow chart of the program which implements the calculation in OS 235, the program is entered at block 800 whenever a particular HICAP service is activated for a particular user. When the program is entered, it then proceeds to block 801 where it distributes to each of the network switches a message. The message includes, inter alia, a default threshold value that has been established for the particular service telephone number, as well as the identity of the associated service. Upon receipt of the message, each such switch, e.g., switch 205 (FIG. 1), stores the value in its associated treatment table.

Following the foregoing, the program exits and is then re-entered at block 802 responsive to receipt from the respective destination switch (e.g., switch 215) the aforementioned traffic data that the switch accumulated in connection with HICAP calls routed to the business customer over the current five minute interval, as mentioned above. At block 802, the program checks to see if the associated HICAP service is active for the user, and exits via block 803 if it finds that is not the case. Otherwise, the program proceeds to block 804. At block 804, the program proceeds to block 805 if it finds that the value of overflow count (OVFL) received from the destination switch is greater than zero. Otherwise, the program proceeds to block 807.

At block 805, the program determines the value of the new threshold (NEWTH) that will be used during the next traffic collecting interval by subtracting from the peg count (OPC) the number of HICAP calls that the destination switch did not route to the business customer over current traffic interval as a result of an all trunks busy condition, i.e., the value of the overflow count (OVFL). The program then divides the result by the value of the traffic interval, which in the present illustrative embodiment is five minutes, as mentioned above.

The program then proceeds to block 813 where it stores in memory, as the value of the current threshold, the value of the new threshold (NEWTH). In addition, the program sends to each of the network switches a message including, inter alia, the value of the new threshold, the identity of the associated HICAP service and the HICAP telephone number assigned to the user. The program then exits via block 814, and is thereafter re-entered at block 802 upon receipt of the traffic statistics that the destination switch accumulates over the next traffic interval.

At block 807, the program proceeds to block 808 if it finds that the value of the current, average usage (AVGUSG) of the trunk group that is used by the destination switch to route the associated HICAP calls to the business customer over the preceding traffic interval is greater than zero. Otherwise, the program proceeds to block 811.

At block 808, the program estimates the capacity of the trunk group that can be supported by the destination switch over the next traffic interval to route HICAP calls to the customer. That is, the program divides the number of available trunks in the trunk group by the value of the average usage. (Where the number of available trunks is determined by subtracting the number of trunks in the trunk group that are maintenance busy (mb) from the total number of trunks (n) in the group.) The program then proceeds to block 809. At block 809, the program proceeds to block 810 if the value of the trunk group capacity is greater then the value of the current threshold. Otherwise, the program proceeds to block 812.

At block 810, the program sets the value of the new threshold (NEWTH) equal to the value of the trunk group capacity and then proceeds to block 813. At block 812 (811) the program sets the value of the new threshold equal to the value of the current threshold (default threshold) and then proceeds to block 813.

In the implementation of the inventive feature of dynamically adapting the threshold value for an active HICAP telephone number, the records forming the treatment table of FIG. 3 are expanded to include additional fields, as shown in FIG. 9. It is seen from FIG. 9, that record entry 903 now includes threshold, current count and interval fields. Accordingly, then, when a switch receives a new threshold value for a particular HICAP number, for example, the fictitious number shown at line 903, the switch stores the value in the associated threshold field. It is understood, of course, that the table of threshold values shown in FIG. 6 may now be deleted as a result of expanding the treatment table, in the manner shown in FIG. 9.

As just discussed, the logic for controlling the value of a threshold is essentially performed at the respective destination switch. Alternatively, the control logic could be implemented at the originating switch. To implement a HICAP control at the originating switch, such as switch 205, requires the switch to track additional data, namely, the number of associated HICAP calls that the switch receives within a predetermined interval of time, for example, a interval of thirty seconds. Each entry (record) in Table 300 of FIG. 3, e.g., record 303, may be easily modified to accumulate that data as shown in FIG. 10 for record 303. It is seen from FIG. 10, that record 303 (as would all of the records of Table 300) is modified to include an additional peg count field to track the number of received calls, occurring over the predetermined period of time.

Specifically, when a particular HICAP service is activated for a telephone number, the operations system sends to each switch that will be processing those calls a respective initial (default) threshold value. The operations systems calculates the threshold default value as a function of a number of parameters—illustratively three parameters as follows $$th_i = AT(\text{Res\_ratio}_i)/\text{Sum\_Res\_ratio} \quad (1)$$

where $th_i$ is the initial threshold value calculated for switch$_i$ (e.g., switch 205); and AT is the allowed throughput (number of requests) from switch$_i$ to the NCP. Res\_ratio$_i$ is a so-called residential line ratio for the respective switch$_i$, that is, if the scope of the active HICAP service is national, then Res\_ratio would be the percentage of the number of lines connected to network switch$_i$ relative to the total number of lines connected to all of the switches forming network 200 (defined herein as the active set). If, on the other hand, the scope of the HICAP service is confined to a particular region, then, the value of Res\_ratio would be relative to the total number of switches serving that region (i.e., the active set). Sum\_Res\_ratio is the total sum of the Res\_ratio values. Which means that if the active set includes all of the network 200 switches, then the value of Sum\_Res\_ratio would be 100 per cent, if not, then the latter value would be sum of the each Res\_ratio calculated for each switch of the active set serving the respective region.

Once the initial (default) threshold value has been calculated for each switch and stored therein and the respective service is activated, then, as mentioned above, each switch in the active set will begin to accumulate, over each 30 second interval, the aforementioned call attempt data. Then, at the end of each such interval, each switch sends that data to the operations system. Responsive to receipt of such data, the operations system then recalculates, for each switch$_i$ in the active set, a new threshold value and sends that value to switch$_i$ for use during the next, succeeding 30 second interval. The operations system calculates the new threshold value $th_i$ based on the following equation:

$$th_i = AT(ATT_i)/\text{tot\_ATT\_AS} \quad (2)$$

where $ATT_i$ is the value of the number of attempts (ATT) received from switch$_i$; and tot\_ATT\_AS is the value of the total (tot) number of attempts for the switches forming the active set (AS).

Figure 11:
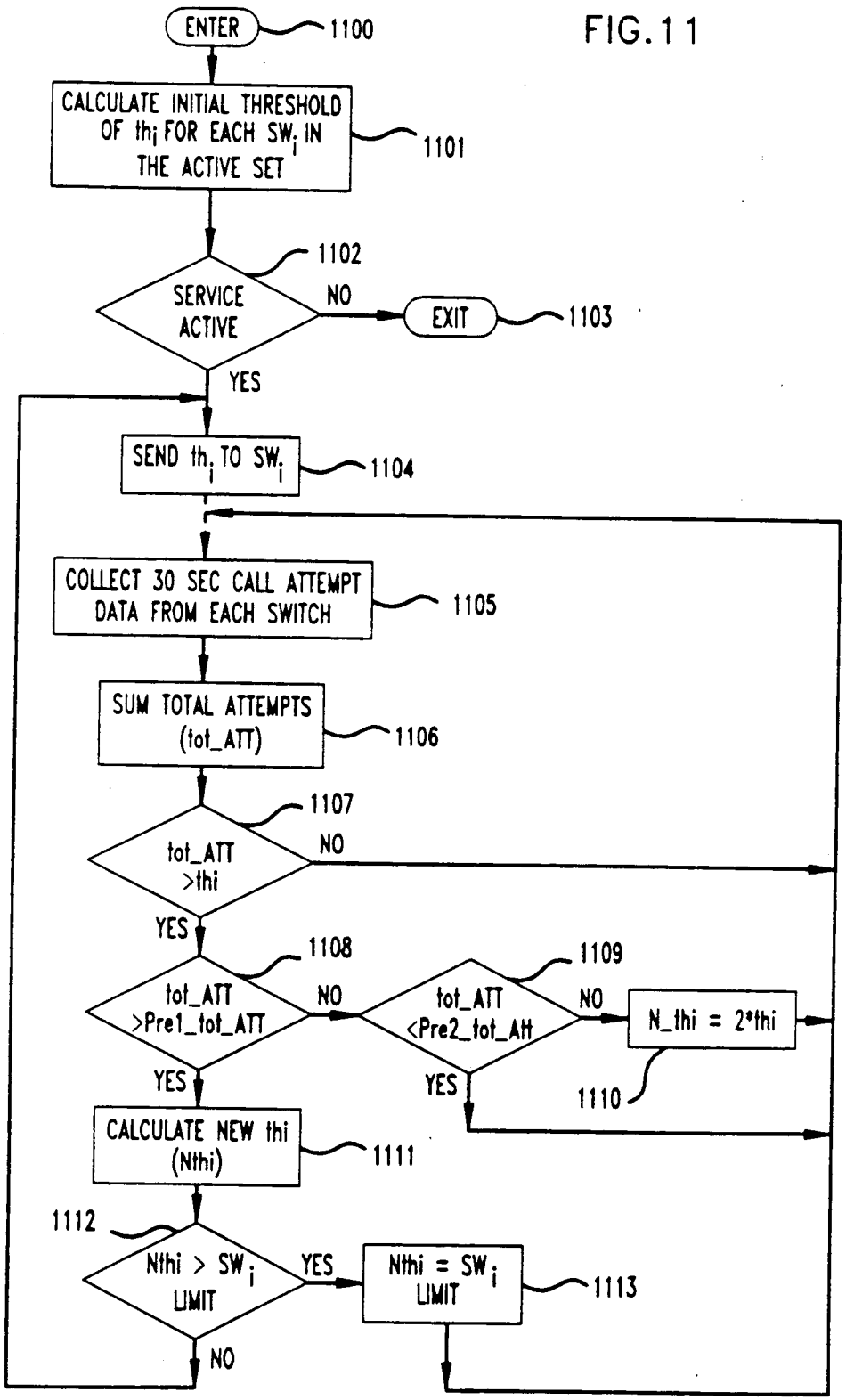
FIG. 11 is a flow chart of the program which implements the alternative dynamic thresholding feature in the operations system of FIG. 1.

Turning now to FIG. 11, there is shown a high-level flow chart of the program which implements the threshold calculation in the operations system. Specifically, the program when entered at block 1100 proceeds to block 1101 where it calculates for each switch$_i$ in the active set and for a HICAP service associated with a particular telephone number the respective initial threshold value and stores the value in its internal memory. As mentioned above, the calculation is done in accordance with equation (1). The switch then proceeds to block 1102 where it checks to see if the associated HICAP service is now active, and proceeds to block 1104 if the program finds that to be the case. Otherwise, the program exits via block 1103.

At block 1104, the program sends to each switch in the active set the respective threshold value calculated at block 1101, thereby completing its initial task. The program is thereafter re-entered at block 1105 responsive to collecting a peg count value from each switch in the active set, and then proceeds to block 1106 upon collecting the last of those values. At block 1106, the program sums the values of the attempt counts (tot\_ATT) that it collected and then proceeds to block 1107. At block 1107, the program compares the value of tot\_ATT with the previous threshold value $th_i$ calculated for switch$_i$. (The program performs this comparison as well as the actions illustrated in blocks 1108 through 1114 for each switch forming the active set. Thus, a discussion of blocks 1107 through 1114 pertains to each switch forming the active set of switches.) If the program finds that the total number of attempts is not greater than the switch$_i$ threshold value, then the program does not calculate a new threshold value for that switch, as represented by the "no" branch of block 1107. Otherwise, the program proceeds to block 1108.

Blocks 1108 and 1109 represent a section of the program which determines whether the total number of attempts (tot\_ATT) is either increasing or decreasing, i.e., a trend in that value. In particular, at block 1108, the program compares the current value of the total attempts with the value of the total attempts (Pre1\_tot\_ATT) determined for a first preceding interval, and proceeds to block 1109 if the former value is not greater than the latter value. Otherwise, the program proceeds to block 1111.

At block 1109, the program compares tot\_ATT with the value of the total attempts accumulated for a second interval (Pre2\_tot\_ATT) preceding the first preceding interval, and proceeds to block 1110 if it finds that the former value is less than the latter value. Otherwise, the program proceeds to block 1105. At block 1110, the program sets the new threshold value Nthi for switch$_i$ to equal twice the value of the previous threshold and then proceeds to block 1105. It is noted that this latter threshold value is not sent to switch$_i$, but is stored in internal memory in place of the current switch$_i$ threshold value.

At block 1111, the program, using equation (2), calculates a new threshold value Nthi for switch$_i$ and proceeds to block 1112. At block 112, the program compares the value of Nthi with a predetermined limiting value, indicating the maximum number of the associated HICAP calls that switch$_i$ can process within the interval defined in table of FIG. 3. If the program finds that the value of Nthi is greater than the switch$_i$ limit, then the program proceeds to block 1104 to send the value of Nthi to switch$_i$. Otherwise, the program proceeds to block 1113 where it sets Nthi to the value of the switch$_i$ limit and then proceeds to block 1105.

Turning now to FIG. 12, there is shown a broad block diagram of a system 200 switch, for example, switch 205, in which the invention may be implemented. Specifically, a switch includes (a) CPU 410, which controls the overall operation of the switch; (b) digital network 402, which routes telephone calls arriving via respective ones of lines 411 to other network 200 switches via respective ones of network links 412; (c) communications interface 401, which interfaces lines 411, and hence the telephone calls with the respective network switch; (d) CCS terminal 403, which interfaces the CCS network with CPU 410 via common bus 406 and OS interface 404, which interfaces the switch with OS 235. CPU 410 includes, inter alia, (a) central control 405, (b) program and call memories 407 and 408, and (c) peripheral circuit interface 409 for interfacing a master control console (not shown) with central control 405. The program (FIG. 7) which implements the invention is stored in memory 407, whereas the associated prescreening and treatment tables as well as the associated traffic data are stored in memory 408.

Although a specific embodiment of the invention has been shown and described, it will be understood that various modifications may be made thereto without departing from the scope and spirit of the invention. For example, although the dynamic thresholding feature was discussed in terms of establishing a threshold for each HICAP subscriber, the feature could be based on a HICAP service rather than a HICAP subscriber, in which case, the implementation thereof would be in accord with FIG. 6 and would not require an expansion of the associated treatment table. In addition, with some loss in the effectiveness to control the rate at which HICAP calls are processed, the invention could be implemented at a network database, rather than at a network switch.

We claim:

1. An arrangement for controlling the rate at which telephone calls are processed by a telecommunications network, said network comprising a plurality of switches, said arrangement comprising means for storing in memory contained in at least one of said switches a plurality of threshold values associated with respective ones of different types of telephone services identified by associated telephone calls originating at said one switch, in which each of said thresholds is operative for controlling the number of calls of the associated type that are routed to a respective destination during a respective interval of time, and means, contained in said at least one switch and operative upon receipt of dialed digits indicative of one of said different types of services, for routing the associated telephone call to its respective destination if said routing of said call does not cause the associated threshold value to be exceeded for the respective current interval of time.

2. The arrangement set forth in claim 1 wherein said thresholds values are associated with respective telephone numbers each indicative of a respective one of said different types of services and wherein said arrangement includes means, external to said one switch and responsive to one of said telephone numbers being active, for dynamically changing the value of the associated threshold until said value substantially reaches an optimum level.

3. An arrangement for controlling the rate at which telephone calls are processed by a telecommunications network, said network comprising a plurality of switches, said arrangement comprising means for storing in memory contained in at least one of said switches a plurality of threshold values associated with respective ones of different types of services, in which each of said thresholds is operative for controlling the number of calls of the associated type that are routed to their respective destinations during a respective interval of time, and means, contained in said at least one switch and operative upon receipt of dialed digits indicative of one of said different types of services, for routing said one type of call to its destination if said routing of said one of type of call does not cause the associated threshold value to be exceeded for the respective current interval of time, wherein said arrangement further comprises an operations system, wherein said destination switch being arranged for accumulating over a predetermined interval traffic data associated with routing to a customer a call associated with a telephone number identified by said dialed digits and for passing said data to said operations system at the end of said traffic interval, and wherein said operations system includes means operative for changing the value of said associated threshold as a function of said data and for sending said changed value to each of said switches for use over the next, subsequent traffic interval.

4. An arrangement for controlling the number of telephone calls associated with different types of high capacity calling services that are processed, within respective intervals of time, by each of a plurality of switches forming a telecommunications network, said arrangement comprising at least one memory contained in each of said switches, said one memory having stored therein a plurality of threshold values associated with respective ones of said services, means, contained in each of said switches, for determining the number of originating telephone calls received over the respective interval of time for each of said services, and means, contained in at least one of said switches and responsive to receipt of a telephone call associated with one of said services and originating at said one switch, for routing said call to a destination switch if the value of the associated one of said thresholds exceeds the value of the number of originating calls associated with said one service that said one switch has thus far received within the respective current interval of time.

5. The arrangement set forth in claim 4 wherein said threshold values are associated with respective telephone numbers identifying respective ones of said services and wherein said arrangement includes means, external to said switches and responsive to one of said telephone numbers being active, for dynamically changing the value of the associated threshold until said value substantially reaches an optimum level.

6. An arrangement for controlling the number of telephone calls associated with different types of high capacity calling services that are processed, within respective intervals of time, by each of a plurality of switches forming a telecommunications network, said arrangement comprising at least one memory contained in each of said switches, said one memory having stored therein a plurality of threshold values associated with respective ones of said services, means, contained in each of said switches, for determining the number of calls received over the respective interval of time for each of said services, and means, contained in at least one of said switches and responsive to receipt of a telephone call associated with one of said services, for routing said call to its destination if the value of the respective one of said thresholds exceeds the value of the number of calls associated with said one service that said one switch has thus far received within the respective current interval of time, wherein said arrangement further comprises an operations system, wherein said destination switch being arranged for accumulating over a predetermined interval traffic data associated with routing to a customer said telephone call and for passing said data to said operations system at the end of said traffic interval, and wherein said operations system includes means operative for changing the value of the threshold associated with said one service as a function of said data and for sending said changed value to each of said switches for use over the next, subsequent traffic interval.

7. A network comprising at least one destination switch for receiving calls routed through said network, at least one other switch for receiving said calls from different sources of calls and routing said calls to said destination switch, said destination switch including means for generating traffic data, including an overflow count, associated with a predetermined trunk group operative for extending said calls to their ultimate destination, said other switch including means for limiting, in accordance with a respective threshold value, the number of said calls that are routed to said destination within a predetermined interval of time, and means, responsive to said traffic data, for changing the value of said threshold at said other switch until said overflow count at said destination switch substantially equals zero.

8. A method of controlling the rate at which telephone calls are processed in a network comprising at least one destination switch and at least one other switch, said method comprising the steps of receiving at said destination node said calls and forwarding them to an associated outgoing trunk group, receiving at said other node and from different sources said calls and routing them to said destination switch, arranging said destination switch so that it generates traffic data associated with said trunk group, and arranging said other switch so that it limits, in accordance with a respective threshold value, the number of said calls that are routed to said destination within a predetermined interval of time, and changing, in accordance with said traffic data, the value of said threshold at said other switch until said value substantially equals an optimum level.

9. A method of controlling the rate at which telephone calls are processed by a telecommunications network, said network comprising a plurality of switches, said method comprising the steps of storing in memory contained in a least one of said switches a plurality of threshold values associated with respective ones of different types of calls originating at said one switch, in which each of said thresholds is operative for controlling the number of originating calls of the associated type that are routed to their respective destinations during a respective interval of time, and arranging said at least one switch so that it responds to receipt of dialed digits indicative of one of said different types of originating calls by routing said one type of call to its destination if said routing of said one of type of call does not cause the associated threshold value to be exceeded for the respective current interval of time.

10. A method for controlling the number of telephone calls associated with different types of high capacity calling services that are processed, within respective intervals of time, by each of a plurality of switches forming a telecommunications network, said method comprising the steps of providing at least one memory in each of said switches, and storing in said one memory a plurality of threshold values associated with respective ones of said services, arranging each of said switches so that it determines the number of originating calls that it receives, over the respective interval of time, for each of said services, and arranging at least one of said switches so that it responds to receipt of a telephone call originating at said one switch and associated with one of said services by routing said call to its destination if the value of the associated one of said thresholds exceeds the value of the number of associated calls that said one switch priorly received within the respective current interval of time for said one service.

* * * * *